(12) United States Patent
Wing et al.

(10) Patent No.: US 11,803,635 B2
(45) Date of Patent: Oct. 31, 2023

(54) PASSING LOCAL CREDENTIALS TO A SECURE BROWSER SESSION

(71) Applicant: CITRIX SYSTEMS, INC., Fort Lauderdale, FL (US)

(72) Inventors: Daniel Wing, Santa Clara, CA (US); Manbinder Pal Singh, Coral Springs, FL (US)

( * ) Notice: Subject to any disclaimer, the term of this patent is extended or adjusted under 35 U.S.C. 154(b) by 87 days.

(21) Appl. No.: 17/239,811

(22) Filed: Apr. 26, 2021

(65) Prior Publication Data
US 2022/0342981 A1    Oct. 27, 2022

(51) Int. Cl.
G06F 21/00        (2013.01)
G06F 21/53        (2013.01)
G06F 21/62        (2013.01)
G06F 21/45        (2013.01)

(52) U.S. Cl.
CPC ............. *G06F 21/53* (2013.01); *G06F 21/45* (2013.01); *G06F 21/62* (2013.01); *G06F 2221/033* (2013.01)

(58) Field of Classification Search
CPC .......... G06F 21/53; G06F 21/45; G06F 21/62; G06F 2221/033
See application file for complete search history.

(56) References Cited

U.S. PATENT DOCUMENTS

| | | | | |
|---|---|---|---|---|
| 6,101,510 A | * | 8/2000 | Stone | G06F 16/954 715/234 |
| 2004/0230825 A1 | * | 11/2004 | Shepherd | G06F 21/6209 715/738 |
| 2007/0043823 A1 | * | 2/2007 | George | H04L 51/04 709/207 |
| 2013/0254829 A1 | * | 9/2013 | Jakubowski | G06F 21/53 726/1 |
| 2015/0058923 A1 | * | 2/2015 | Rajagopal | G06F 21/36 726/1 |
| 2020/0104478 A1 | * | 4/2020 | Chauhan | H04L 67/02 |
| 2020/0228561 A1 | * | 7/2020 | Petry | H04L 67/53 |
| 2020/0314071 A1 | * | 10/2020 | Sorenson | G06F 9/4843 |

* cited by examiner

*Primary Examiner* — Ghazal B Shehni

(57) ABSTRACT

A computing device includes a memory and a processor configured to receive credentials stored on a client device for a website responsive to the client device initiating a launch of the website through a first browser at the client device. The processor runs a second browser to launch the website for display at the client device using the received credentials and some state information is synchronized between them for the duration of the session. The second browser isolates the website from access to other data of the client device.

25 Claims, 15 Drawing Sheets

PASSING LOCAL CREDENTIALS TO A SECURE BROWSER SESSION

TECHNICAL FIELD

The present disclosure relates to computer systems, and more particularly, to remote browser applications.

BACKGROUND

A secure browser service isolates web browsing to protect an enterprise network from browser-based attacks. The isolation allows bad actors to attack, and perhaps compromise, individual sessions of the secure browser service but not other devices of the network. To isolate a session, a secure remote browser is provided to access internet hosted web applications. By isolating internet browsing, IT administrators can offer end users safe internet access without compromising the security posture of client machines, and thereby limiting an attack surface of the network.

A published resource may be launched using a non-secure local browser on a client device, or may be redirected to launch using a secure remote browser in a secure browser session. It is useful for some state to be synchronized between those browsers.

SUMMARY

A computing device includes a memory and a processor to receive credentials stored on a client device for a website responsive to the client device initiating a launch of the website through a first browser at the client device. The processor runs a second browser to launch the website for display at the client device using the received credentials. The second browser isolates the website from access to other data of the client device.

The isolation may prevent the website from directly transferring any browsing data to or from the client device.

The processor may run the second browser in a computing session, and may be further configured to discard the received credentials after the computing session has ended.

The received credentials may be only for the website to be launched. The credentials may be received from the client device.

The processor may be further configured to store the credentials during a computing session, monitor for changes in the stored credentials made by a user of the client device during the computing session, and provide the changes in the credentials to the client device for the client device to update the credentials stored on the client device.

The processor may be assigned to the client device by a second computing device after the second computing device receives a request from the client device for the website to be launched. The processor may receive a launch address for the website from the second computing device. The request from the client device for the website to be launched may include the credentials, and wherein the processor may receive the credentials from the second computing device. The processor may be further configured to validate the client device via the second computing device prior to running the second browser.

Another aspect is directed to a method for operating a computing device as described above. The method includes receiving credentials stored on a client device for a website responsive to the client device initiating a launch of the website through a first browser at the client device. The method further includes running a second browser to launch the website for display at the client device using the received credentials. The second browser isolates the website from access to other data of the client device.

Yet another aspect is directed to a method comprising operating a browser on a client device to select a web page to be launched, and directing the browser to an address of a first computing device in response to selection of the web page. The first computing device is to provide access to a second browser that isolates the web page from access to data of the client device. The method further includes opening the web page with use of the address of the first computing device and the second browser, and modifying the display of the web page opened in the second browser provided by the browser on the client device to include the address of the web page instead of the address of the first computing device.

The displayed address of the web page may provide an identity of the web page so a user of the client device avoids interacting with a malicious site.

The second browser may be run in a computing session, and the method may further include copying the displayed address of the web page to be used to launch the web page in a different computing session.

The method may further include displaying by the client device the web page, generating a refresh command by the browser in the client device to refresh the displayed web page, and intercepting by the client device the generated refresh command. The intercepted refresh command may be redirected to the second browser, with the second browser refreshing the web page being displayed by the client device.

The method may further include updating the browser in the client device in response to an address change in the second browser.

The method may further include providing an update to the browser in the client device in response to a title change in the web page.

The method may further include updating the certificate information for the website that can be displayed by the client device.

DETAILED DESCRIPTION

Figure 1:
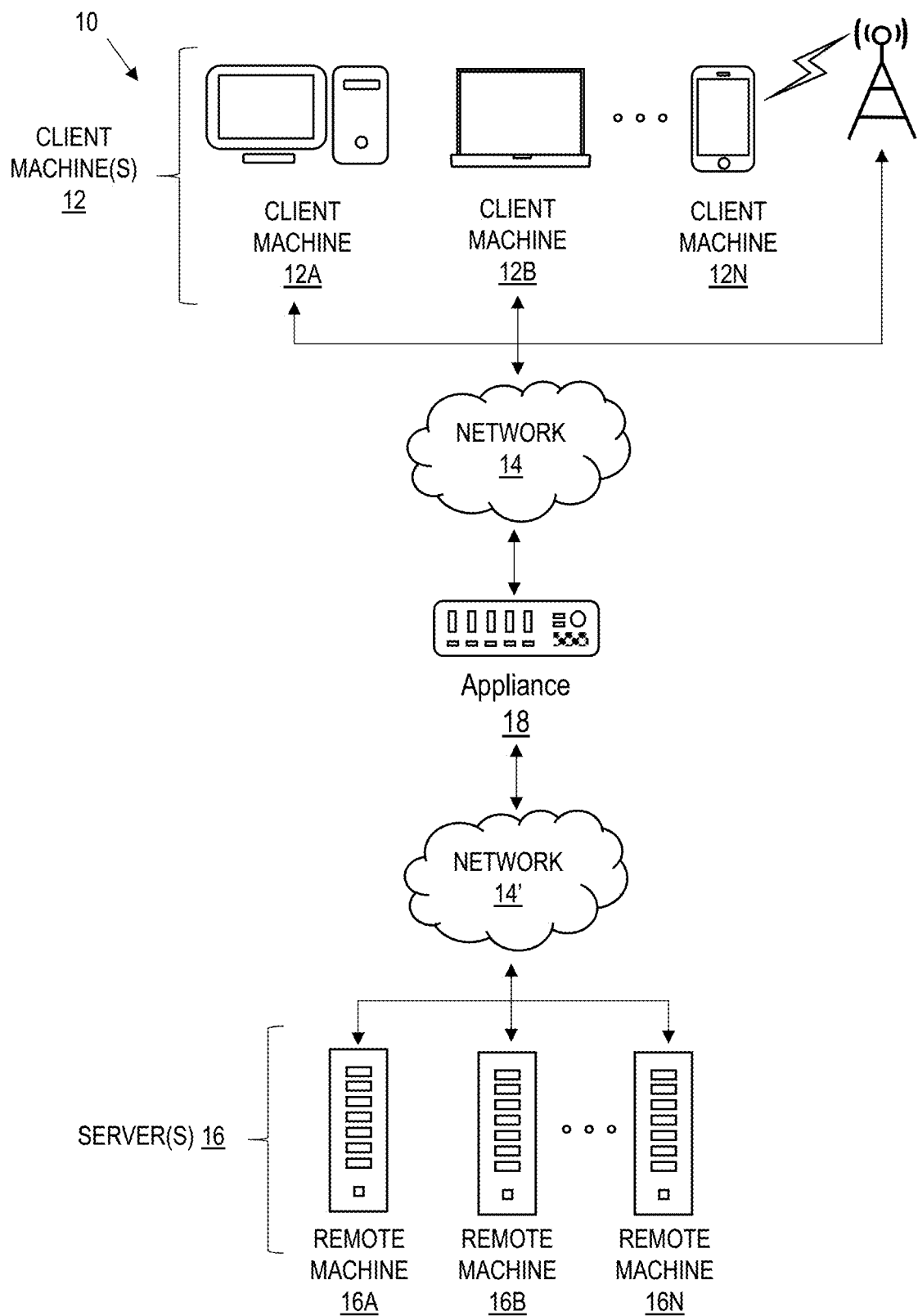
FIG. 1 is a schematic block diagram of a network environment of computing devices in which various aspects of the disclosure may be implemented.

To access a website in a secure browser session, a navigation request handler directs the request to a secure browser service. The navigation handler decides if the session is handled by the local browser or the remote browser. The navigation handler may be implemented using a Proxy PAC file, special DNS responses, a browser extension, or source code of the browser itself. In response to the request, the secure browser service identifies a virtual delivery appliance (VDA) to set up a virtual computing session for the client device. The virtual computing session will include the secure remote browser. The secure browser service also provides data back to the client device. This data is used by the client device to make a connection with the virtual computing session. Once a connection is made and the client device is authenticated, the secure remote browser navigates to the address (i.e., URL) of the website, as provided by the secure browser service.

Typically, the website requires the user of the client device to log-in before it can be launched. The secure remote browser is isolated from the client device and thus has no means to access specific user information (e.g., passwords, tokens, or the alike) available on the client device or elsewhere on the network. To access applications with use of existing secure browser technologies, the user has to type in their credentials. This requires the user to remember their credentials, such as username and password, each time the website is to be launched in the secure remote browser. Because the secure browser session starts without state, including without the user's password store, the user has to type in their credentials in a secure browser session which diminishes the user experience compared to the native browser which has the user's password store.

There is also a risk that a user may enter their credentials, while in the secure browser session, into a malicious website without knowing it. This is due to the address (i.e., URL) being displayed on the address bar of the local browser is the address for the secure browser service rather than the address of the target website being launched by the secure remote browser. Consequently, the displayed address does not hint at or otherwise identify the target website.

As will be described in detail below, state information may be synchronized between the local browser and the secure remote browser. This synchronization is bi-directional during duration of the session.

In terms of synchronizing state information from the local browser to the secure remote browser, the user credentials from the local browser are provided to the secure remote browser so that the user credentials are autofilled in order to launch the website. In response to the user clicking a refresh command in the local browser, the refresh command is provided to the secure remote browser for action instead of by the local browser. A user may also initiate via the local browser a new navigation in a secure browser session by typing into the URL bar of an existing secure browser session or by clicking a bookmark while viewing an existing remote browser session, for example.

In terms of synchronizing state information from the secure remote browser to the local browser, updates or changes made to the user credentials while in the secure browser session are copied back to the local browser to be updated in the local autofill store. In response to receiving the refresh command from the local browser, state information provide to the local browser includes the visited URL and tab titles of the visited website, for example. In addition, security information (e.g., certificate) for the target website may be provided to the local browser.

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 18 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
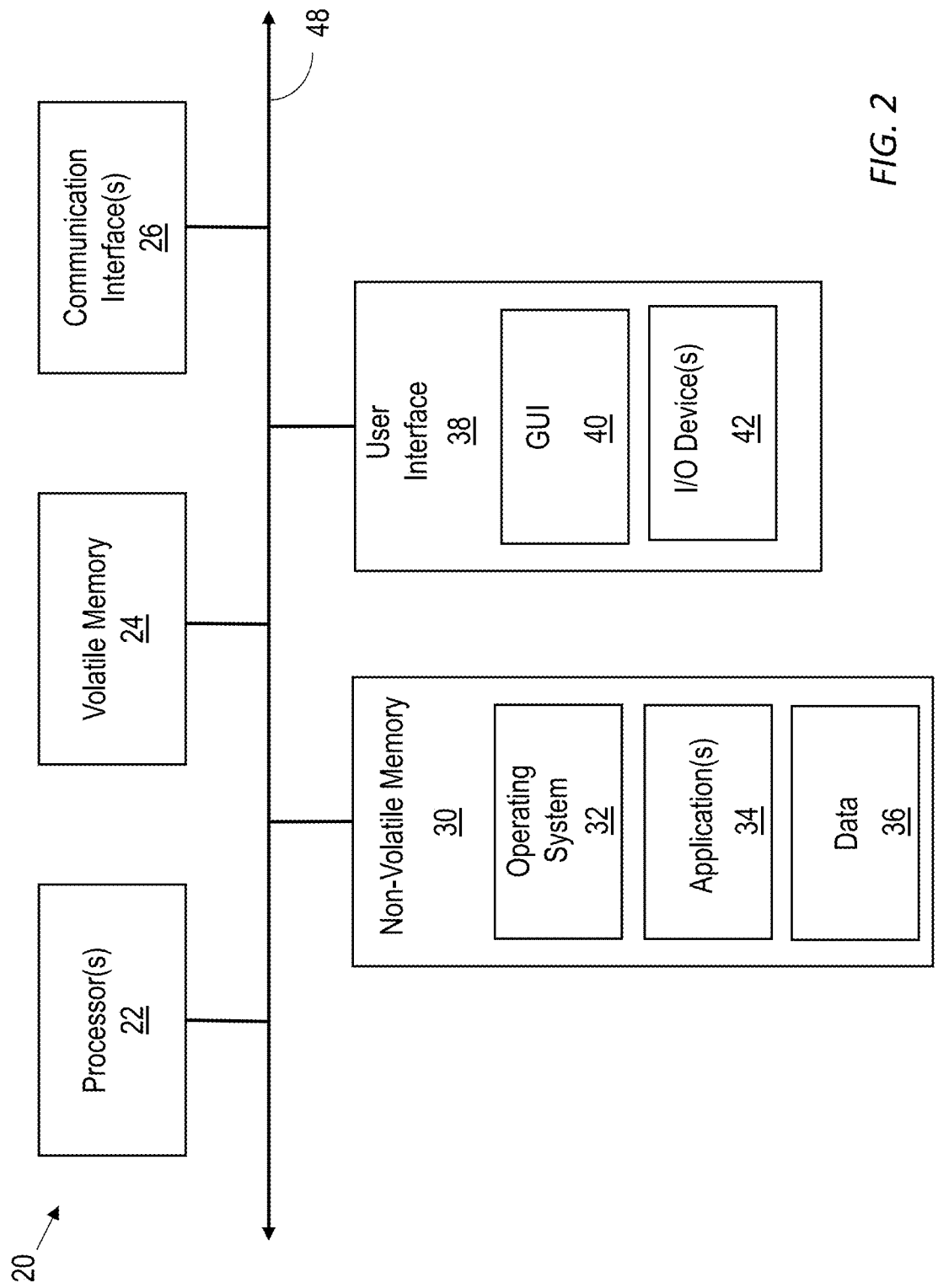
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
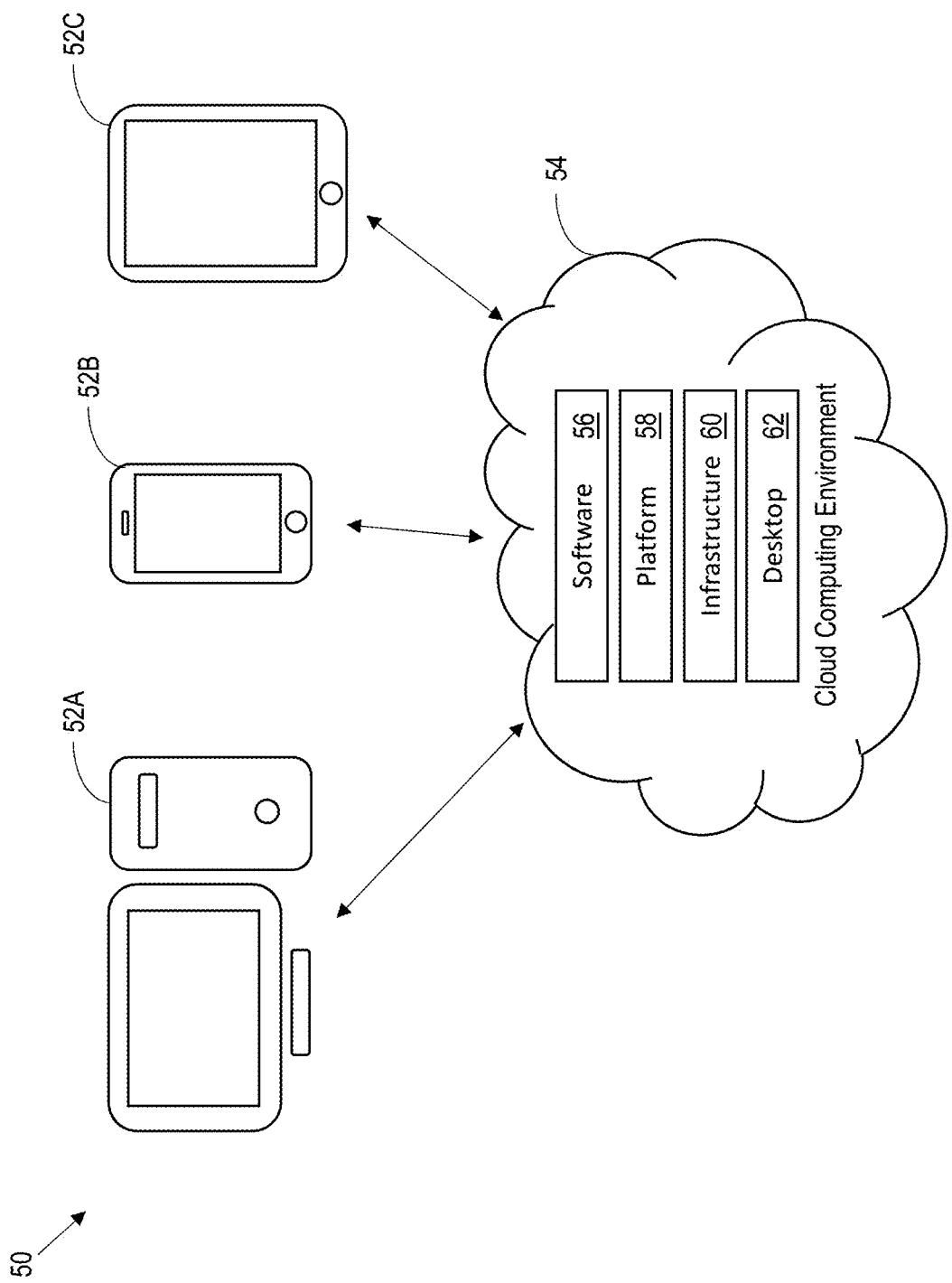
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft ONEDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
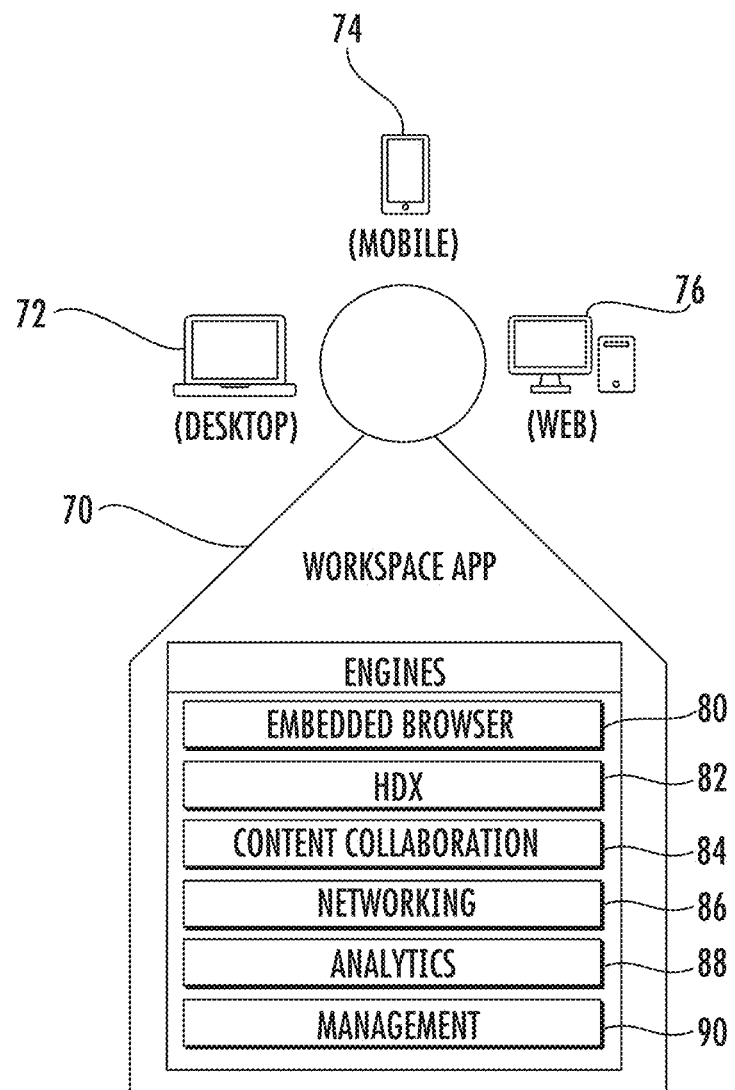
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific μ-VPN connection. A μ-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
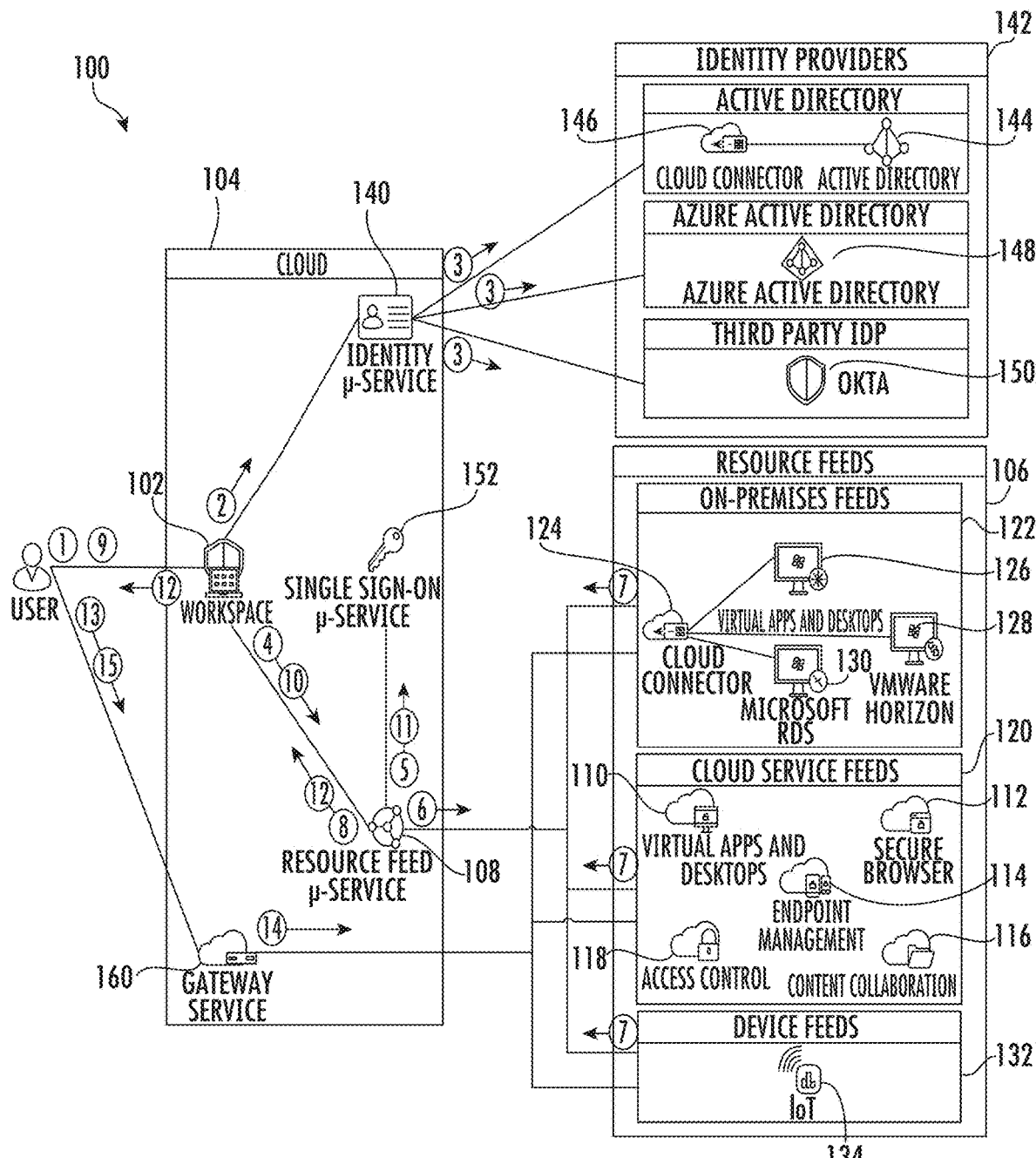
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
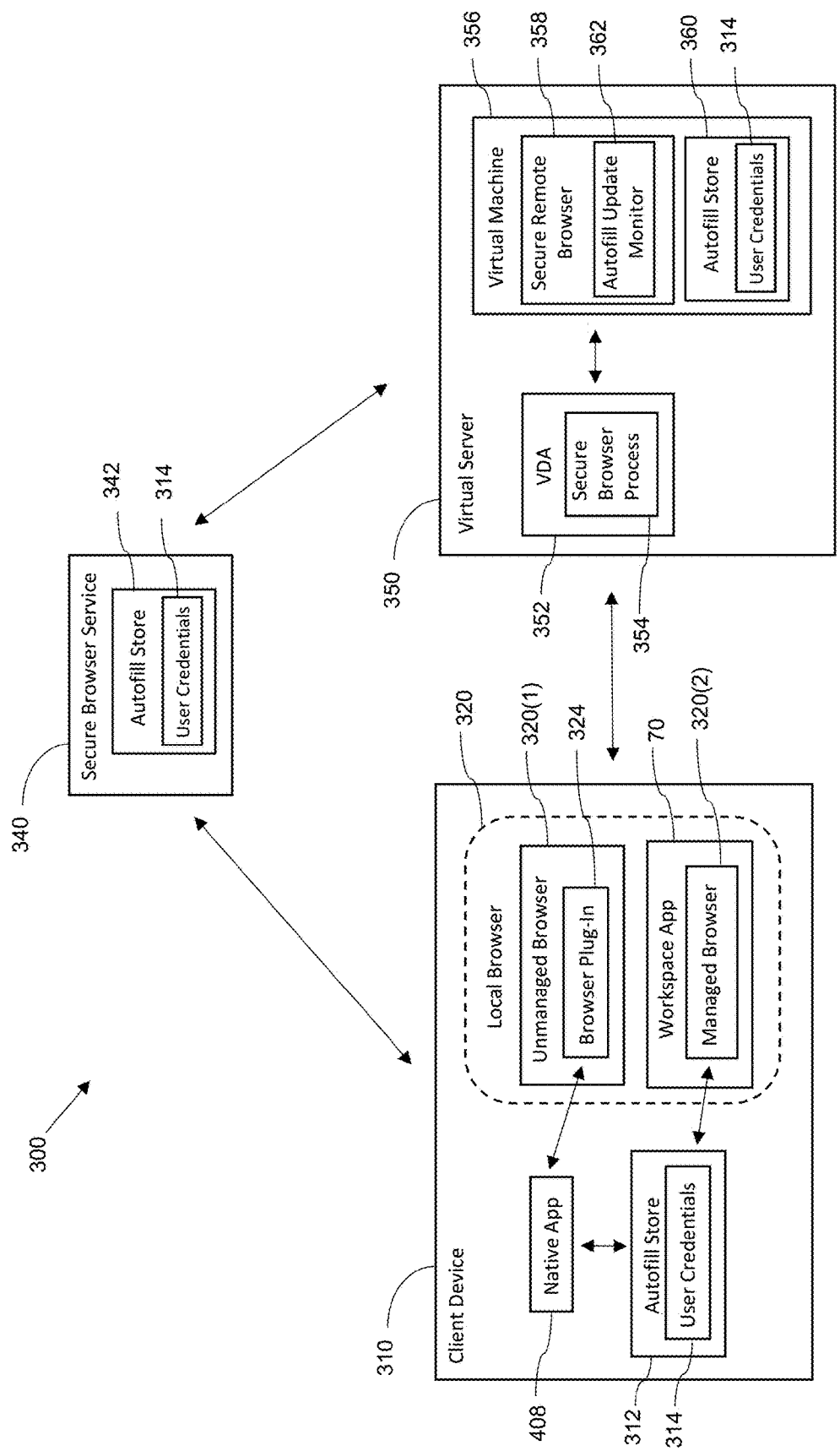
FIG. 6 is a schematic block diagram of a computer system with a secure remote browser having an autofill function in which various aspects of the disclosure may be implemented.

Referring now to FIG. 6, the illustrated computer system 300 provides an autofill function to be used by a secure remote browser 358 for launching a website or web page in a secure browser session. The computer system 300 includes at least one client device 310, a secure browser service 340, and a virtual server 350. The autofill function improves user log-in to the website launched using the secure browser service 340.

The secure browser service 340 coordinates the secure browser session between the client device 310 and the virtual server 350. The virtual server 350 provides a virtual delivery appliance (VDA) 352 which sets up a virtual machine 356 with the secure remote browser 358 to be used to launch the website in the secure browser session.

The secure browser service 340 isolates web browsing to protect a user from browser-based attacks. Browser isolation causes the web browser to run inside an isolated environment, like a container, sandbox or virtual machine, in order to protect the user's local computer from browser exploits or malware encountered while browsing. This isolation may be implemented on the local computer or remotely on a server. The secure remote browser 358 isolates the user's browsing session from accessing other data of the client device 310. This isolation prevents the website from transferring malware or leveraging browser exploits to attack the client device 310. An example secure browser service is provided by Citrix Systems, Inc., where users visit web pages using the secure remote browser 358.

Since the website to be launched by the secure remote browser 358 cannot directly access the filesystem of the client device 310, the autofill feature is not available to the secure remote browser 358. This requires the user to type in their credentials 314 every time the website is to be launched using the secure browser service 340. User credentials 314 include usernames and passwords, for example. Consequently, having the autofill function for use by a secure remote browser 358 for launching a website in a secure browser session saves the user effort in remembering and typing their username (or email) and password for that website, as well as leveraging the secure remote browser's identity validation of the visited website.

As will be described in detail below, user experience is improved by copying the user credentials 314 to the secure browser session for the website to be launched by the secure remote browser 358. As will be explained below, the user credentials 314 may be provided to the secure remote browser 358 via the secure browser service 340. Alternatively, the user credentials 314 may be provided directly to the secure remote browser 358 by the client device 310.

In addition, if a change is made in the user credentials 314 for that website while in the secure browser session, then the changes are copied back to the local browser 320 to be updated in the autofill store 312. This allows subsequent secure browser sessions launching the same website to benefit from the autofill feature.

More particularly, the client device 310 includes the autofill store 312 having the user credentials 314 stored therein, and the local browser 320. The autofill store 312 may also be referred to as a local autofill store since the user credentials 314 are stored on the client device 310.

The local browser 320 is configured to identify a website to be launched using the secure remote browser 358, and fetch the user credentials 314 from the local autofill store 312 for the website to be launched using the secure remote browser 358. The local browser 320 then requests from the secure browser service 340 a secure remote browser launch address for the website to be launched using the secure remote browser 358. In some cases, the local browser 320 may also be referred to as a first browser, and the secure remote browser 358 may also be referred to as a second browser.

The virtual machine 356 within the virtual server 350 is configured to receive the fetched user credentials 314, and the virtual machine 356 includes the secure remote browser 358 to be accessed by the client device 310. The secure remote browser 358 is configured to autofill the received fetched user credentials 314 to launch the website.

To improve security of the secure remote browser 358, the user credentials 314 are fetched only for the visited website. If the secure remote browser 358 was successfully attacked, then the user credentials 314 for only that website are exposed to the attacker. As an alternative to fetching the user credentials 314 from the autofill store 312 for only the visited website, all or a subset of the user credentials 314 in the autofill store 312 may be fetched.

In addition to copying the user credentials 314 (i.e., username and password) for the visited website to the secure browser session, other autofill information may be copied. The other autofill information may include addresses and credit card data, for example.

As noted above, the local browser 320 on the client device 310 is configured to implement the autofill feature to be used by the secure remote browser 358 for launching a website in a secure browser session. The autofill feature for the secure remote browser 358 is different than the autofill feature provided for the local browser 320. The local browser 320 may be an unmanaged browser 320(1) or a managed browser 320(2). Typically, both browser types will be on the client device 310.

The unmanaged browser 320(1) may be referred to as a native browser, and the managed browser 320(2) may be referred to as an embedded browser. Either the unmanaged browser 320(1) or the managed browser 320(2) may be used to connect to the same secure browser service 340.

Example unmanaged browsers 320(1) include Chrome developed by Google, Firefox developed by Mozilla, and Edge developed by Microsoft. The source code for an unmanaged browser 320(1) is a closed source software framework and cannot be modified. To implement the autofill feature with the unmanaged browser 320(1), a browser plug-in or extension 324 can be used.

A browser plug-in 324 is a set of software components that can be added to the unmanaged browser 320(1) to increase its capabilities. In this case, the browser plug-in 324 is used to implement the autofill feature to be used by the secure remote browser 358.

However, the browser plug-in 324 may not have permission to interface directly with the local autofill store 312. Instead, the browser plug-in 324 may have permission to interface with a native application 334 running on the client device 310. The native application 334 may be part of the workspace app 70 or a separate process running on the local device 310. In both cases, the source code of the native application 328 can be modified to fetch the user credentials 314 from the local autofill store 312.

The browser plug-in 324 then receives the fetched user credentials 314 from the native application 334. This allows the browser plug-in 324 to provide the user credentials 314 to the secure browser service 340 when a request is made to launch a website in a secure browser session.

With the managed browser 320(2), the source code can be modified. An example managed browser is Chromium. The Chromium browser is embedded within another application, such as the workspace app 70. The Chromium embedded browser enables developers to add web browsing functionality to their application, as well as the ability to use HTML, CSS, and JavaScript to create the application's user interface. In this case, the source code for the managed browser 320(2) is modified to directly interface with the autofill store 312 to fetch the user credentials 314, which are then provided to the secure browser service 340 when a request is made to launch a website in a secure browser session.

Figure 7:
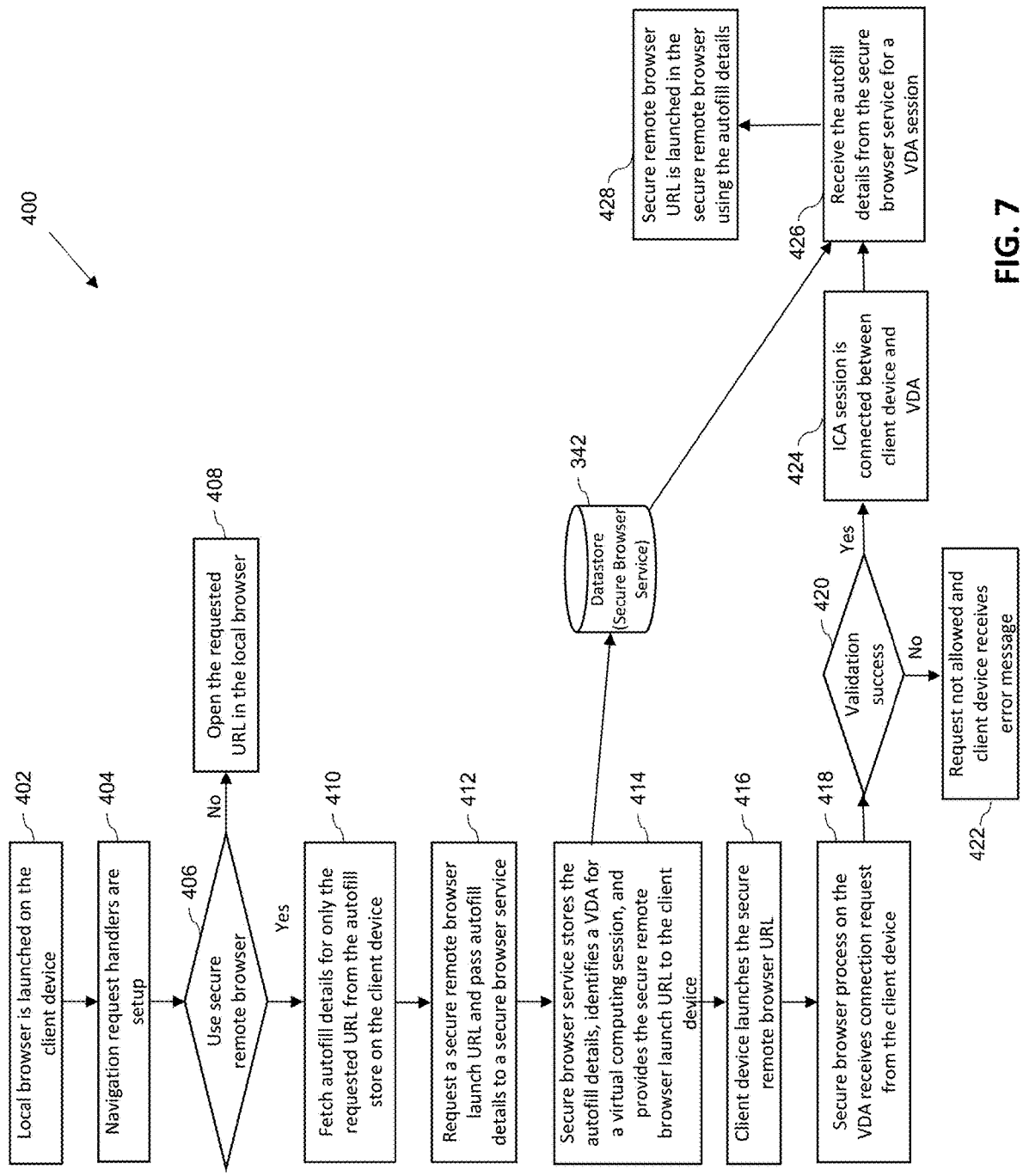
FIG. 7 is a flow diagram providing the autofill function to the secure remote browser illustrated in FIG. 6.

Referring now to FIG. 7, a flow diagram 400 illustrating a website being launched in a secure browser session with the user credentials 314 being autofilled will be discussed. From the start, the local browser 320 is launched on the client device 310 at Block 402. As noted above, the local browser 320 may be an unmanaged browser 320(1) or a managed browser 320(2). The local browser 320 is launched, for example, by the user clicking a link within a published application (i.e., resource), such as a web/SaaS app, or the user types in the address (i.e., URL) of the website in the browser address bar, or the location(s) the browser is configured to open on startup.

Navigation request handlers are setup at Block 404, and are used to determine whether the website is to be launched in a secure browser session. Setup of the navigation request handlers is typically performed by an IT administrator. As noted above, the navigation handler may be implemented using a Proxy PAC file, special DNS responses, a browser extension, or source code of the browser itself. The Proxy PAC file is a text file that instructs a browser to forward traffic to a proxy server, instead of directly to the destination server. It contains JavaScript that specifies the proxy server and optionally, additional parameters that specify when and under what circumstances a browser forwards traffic to the proxy server. DNS stands for Domain Name System, which is how domain names are translated into IP addresses. DNS is what allows you to use your web browser to find web sites as well as send and receive email.

A navigation occurs, for example, in response to the user clicking the link within a published resource or typing the address in the browser address bar of the local browser 320. The navigation request handlers are associated with a launch address (i.e., URL) of the selected website. For the unmanaged browser 320(1), the browser plug-in 324 is used to provide the navigation request handlers. For the managed browser 320(2), the workspace app 70 may provide the navigation request handlers.

Based on how the navigation request handlers are setup for the selected website, a determination is made at Block 406 to launch the website in a secure browser session, or to launch the website using the local browser 320. If the decision is to use the local browser 320, then the process continues to Block 408. If the decision is to use the secure browser service 340, then the process continues to Block 410.

At Block 410, user credentials 314 for the website are fetched from the local autofill store 312. This is performed by the local device 310. The user credentials 314 are fetched only for the website to be launched in the secure browser session. An advantage of this is that if the secure browser session was successfully hacked, then only the user credentials 314 for that one website would be exposed.

The user credentials 314 may be fetched by the unmanaged browser 320(1) via the browser plug-in 324 by interfacing with the autofill store 312 via a native application 334. Alternatively, the user credentials 314 may be fetched via the managed browser 320(2) by directly interfacing with the autofill store 312.

For the website to be launched in a secure browser session, a request is made by the local browser 320 to the secure browser service 340 at Block 412 for a secure browser launch address (i.e., URL). As part of the request, the user credentials 314 for the selected website are passed to the secure browser service 340 by the local browser 320. The user credentials 314 may be encrypted when passed to the secure browser service 340. This request may be made by calling the API of the secure browser service 340 that a particular website is to be launched. For example, gmail-.com may be the selected website that is to be launched in a secure browser session.

At Block 414, the secure browser service 340 stores the received autofill details in a data store 342, and processes the request from the client device 310. The secure browser service 340 identifies a virtual delivery appliance (VDA) 352 for a virtual computing session to be accessed by the client device 310. A secure remote browser launch URL is also provided to the client device 310 by the secure browser service 340.

Access to a virtual computing session may be provided using Citrix Virtual Apps and Desktops (CVAD) from Citrix Systems, Inc. Citrix Virtual Apps is an application virtualization solution that helps optimize productivity with universal access to virtual apps and server-based desktops from different client devices.

Such computer virtualization infrastructures may traditionally utilize an Independent Computing Architecture (ICA) protocol and ICA files for authenticating the client device 310 to access the virtual computing session and computing resources to which the user is entitled. ICA is a protocol designed for transmitting Windows graphical display data as well as user input over a network. ICA files contain short-lived Secure Ticket Authority (STA) and logon tickets. The STA ticket may be used to authorize a connection to a virtual delivery appliance 352 (e.g., Citrix Virtual Delivery Agent) via a gateway (e.g., Citrix Gateway) or via a gateway service (e.g., Citrix Gateway Service). The logon ticket may single-sign-on (SSOn) the user into the virtual computing session.

The client device 310 launches in the local browser 320 the received secure remote browser URL at Block 416. The secure browser process 354 on the VDA 352 receives the connection request from the client device 310 at Block 418. As part of the connection request, the secure browser process 354 receives an ICA file with a ticket.

To validate the connection request at Block 420, the secure browser process communicates with the secure browser service 340 to validate the ticket. If the ticket is not validated, then the connection request is not allowed and the client device 310 receives an error message at Block 422. If the ticket is validated, then an ICA session is connected between the client device 310 and the VDA 352 at Block 424.

At Block 426, the VDA 352 receives the autofill details from the secure browser service 340. The autofill details are stored in an autofill store 360 on the virtual machine 356. The autofill details may be provided by the secure browser service 340 to the VDA 352 before the ICA session is connected between the client device and the VDA 352. The secure remote browser URL is launched in the secure remote browser 358 at Block 428 using the autofill details fetched from the autofill store 360.

As part of the overall process illustrated by flow diagram 400, the secure browser service 340 may send a message to the VDA 352 before the client device 310 has started to connect to the VDA 352. The message from the secure browser service 340 is to notify the VDA 352 that there will be a connection request coming from the client device 310. The fetched autofill details may also be provided in this message, with the fetched autofill details being placed in the autofill store 360 within the virtual machine 356.

The secure remote browser launch address may also be provided by the secure browser service 340 to the VDA 352 before the client device 310 has started to connect to the VDA 352. When the VDA 352 receives an ICA file from the client device 310, a connection may then be established after validation of the client device 310.

The ICA file includes a validation ticket that is received by the secure browser process 354 running within the VDA 352. The secure browser process 354 then communicates with the secure browser service 340 to confirm validation of the ticket. In response to receiving confirmation that the ticket is correct, the secure remote browser 358 will already know the secure remote browser launch address for launching the website using the autofill details fetched from the autofill store 360.

As an alternative to the VDA 352 receiving the fetched autofill details from the secure browser service 340, the autofill details may be provided by the local browser 320 to the VDA 352 as part of the connection request received by the VDA 352 in Block 418. In this embodiment, the secure browser service 340 receives the request from the local browser 320 for the secure remote browser launch address but does not receive the fetched autofill details. Instead, the fetched autofill details are provided by the local browser 320 directly to the VDA 352 when the ICA session is connected between the client device 310 and the VDA 352.

Figure 8:
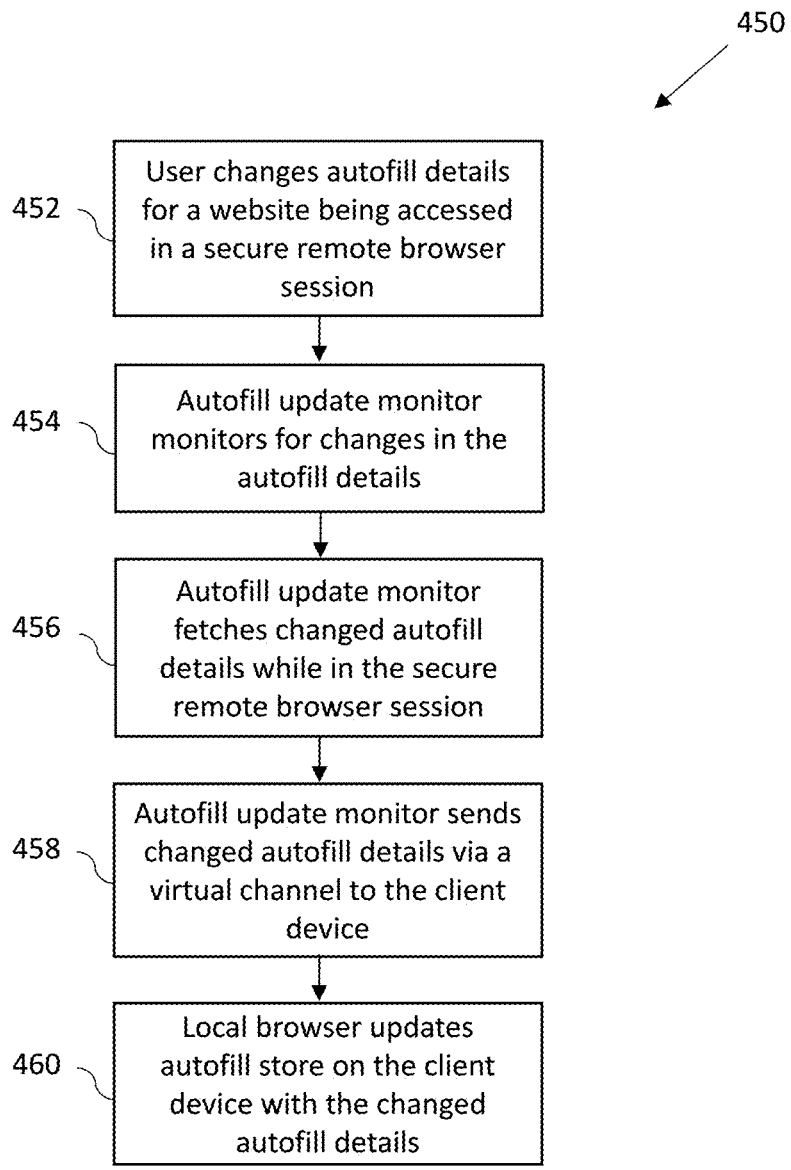
FIG. 8 is a flow diagram for updating the autofill store on the client device in response to changes made in the autofill details by the secure remote browser illustrated in FIG. 6.

Referring now to the flowchart 450 in FIG. 8, new autofill details may be created or existing autofill details may be changed at Block 452 while accessing a website in a secure remote browser session. In some situations, the user of the client device 310 may create a username/password for a new website being launched within the secure remote browser session, or the user may change their password for a website already launched within the secure remote browser session.

When this occurs, the new or updated username/password needs to be synchronized or otherwise provided back to the local browser 320 on the client device 310. This allows the user credentials 314 in the autofill store 312 on the client device 310 to be updated. When a new secure remote browser session is later started with the same website, the new/updated username/password can be provided to that new secure remote browser session.

This is accomplished at Block 454 by an autofill update monitor 362 detecting for changes to the autofill store 360 on the virtual machine 356. The autofill update monitor 362 may be provided via an injected JavaScript, a browser extension, or by modifying the source code for the secure remote browser 358. The secure remote browser 358 may be either an unmanaged browser or a managed browser as discussed above.

When an update occurs, the autofill update monitor 362 fetches the changed autofill details from the autofill store 360 on the virtual machine 356 at Block 456. The updated autofill details are sent to the client device 310 at Block 458. The updated autofill details may be sent over a virtual channel between the client device 310 and the virtual machine 356. The user credentials 314 in the autofill store 312 are then updated by the local browser 320 of the client device 310 at Block 460.

Figure 9:
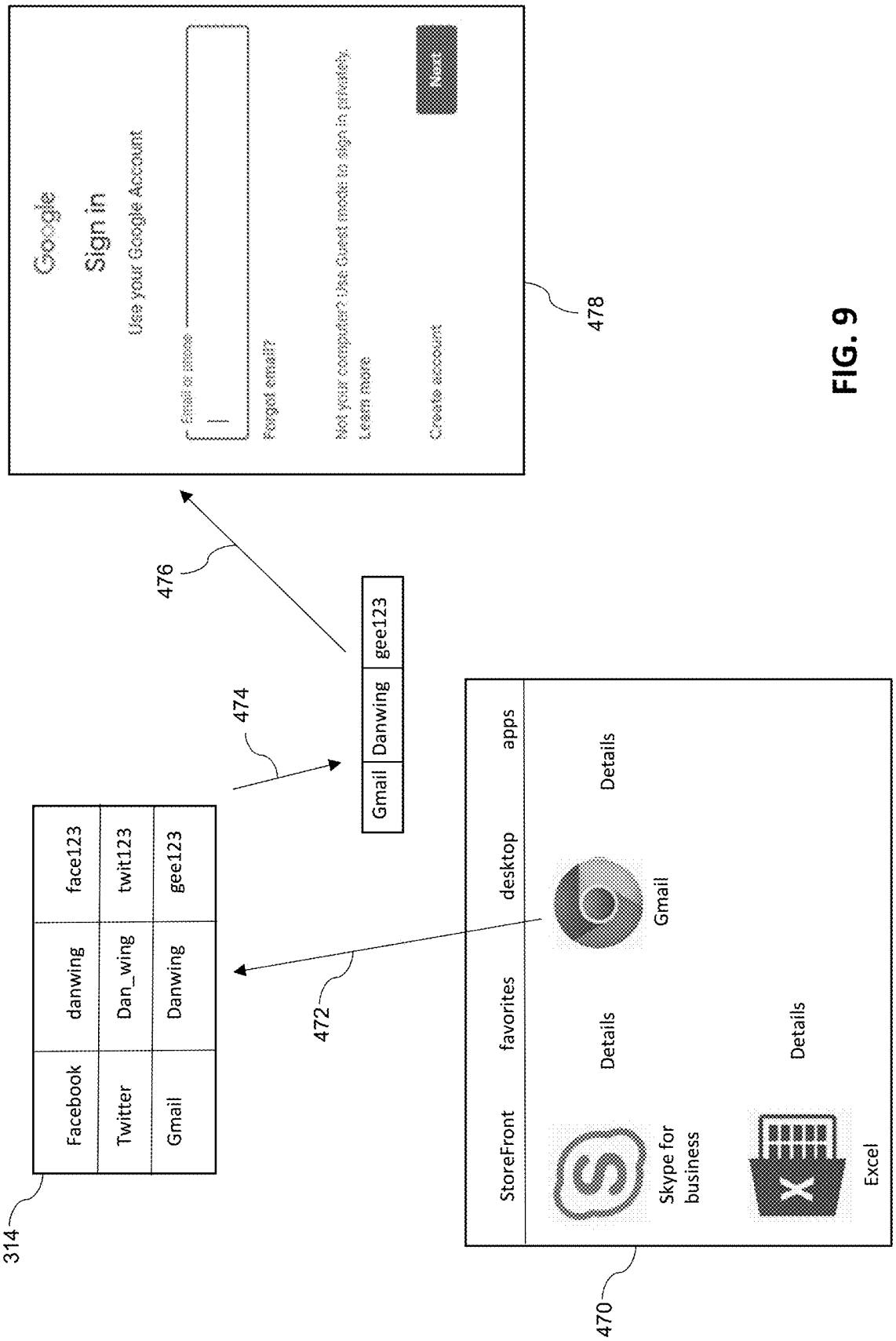
FIG. 9 is a collection of screen shots to illustrate autofill details provided for an example website being launched in the secure remote browser for the computer system illustrated in FIG. 6.

Autofill details provided for an example website being launched in the secure remote browser 358 will be discussed in reference to FIG. 9. The autofill store 312 on the client device 310 includes, for example, user credentials 314 for web applications, such as Facebook, Twitter and Gmail.

A screen shot 470 of published resources (e.g., a web application) on the client device 310 shows the resources that are available for the user. In this example, the user selects Gmail. The local browser 320 is configured to only fetch the user credentials 314 for Gmail, as indicated by arrows 472 and 474. A screen shot 478 of a sign-in page for Gmail is provided. Gmail is to be launched using the secure remote browser 358 with the received fetched user credentials being autofilled, as indicated by arrow 476. If multiple credentials are available for that site (e.g., multiple users share that same client device 310), they are all sent to the remote browser 358 so the user can choose which credential for that session, mimicking behavior that would have occurred if this session was entirely run on the local browser 320.

Figure 10:
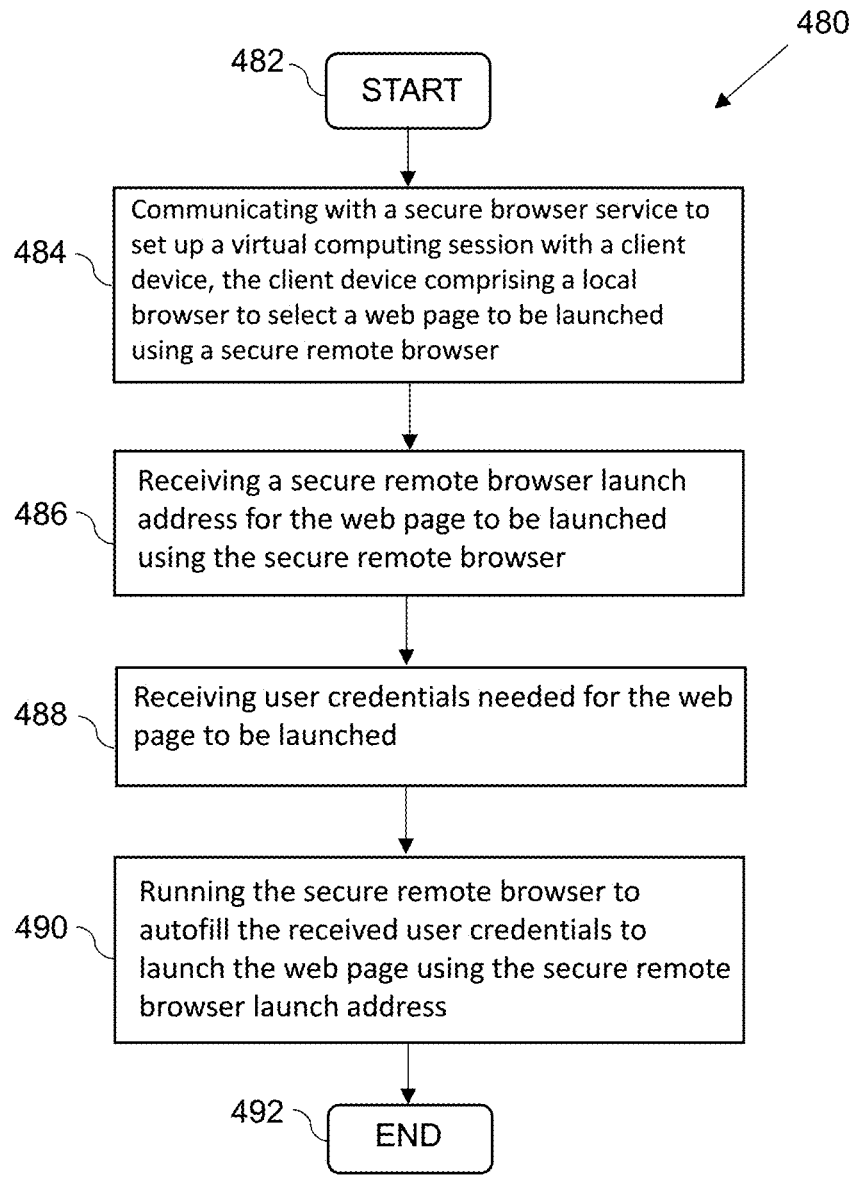
FIG. 10 is a flow diagram for operating the virtual server illustrated in FIG. 6.

From a perspective of the virtual server 350 as discussed above, the virtual sever 350 includes the secure remote browser 358 and a processor. The processor is included within the virtual machine 356. A method for operating the virtual server 350 will be discussed in reference to the flow diagram 480 in FIG. 10.

From the start (Block 482), the method includes communicating with a secure browser service 340 at Block 484 to set up a virtual computing session with the client device 310. The client device 310 includes a local browser 320 to select or otherwise provide information to launch a web page using the secure remote browser 358. An address (e.g., a secure remote browser launch address) for the web page to be launched using the secure remote browser 358 is received at Block 486. User credentials 314 needed for the web page to be launched are received at Block 488. The method further includes running the secure remote browser 358 at Block 490 to open the web page corresponding to the address received from the local browser 320 (e.g., to autofill the received user credentials 314 to launch the web page using the secure remote browser launch address). The method ends at Block 492.

Figure 11:
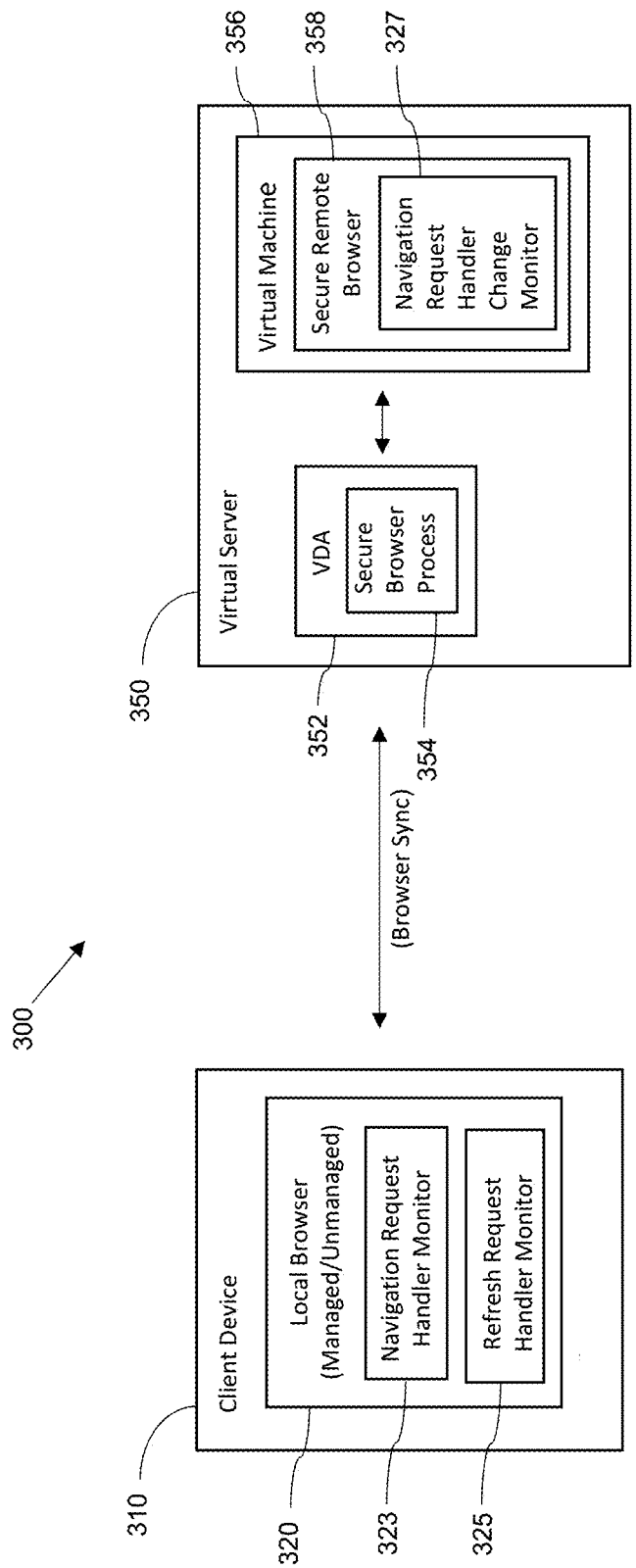
FIG. 11 is a simplified schematic block diagram of the computer system illustrated in FIG. 6 with bi-directional browser synchronization between the local browser and the secure remote browser.

Referring now to FIG. 11, another aspect of the computer system 300 is to bring virtualized browser information (e.g., target URL, tab title) to the local browser 320 for displaying to the user. In addition, user actions (e.g., clicking refresh) in the local browser 320 are to be brought to the secure remote browser 358 for action by the secure remote browser 358 instead of by the local browser 320.

For illustration purposes, the computer system 300 in FIG. 11 has been simplified to focus on the bi-directional local browser/secure remote browser state synchronization. Even though the autofill function and the secure browser service 340 as illustrated in FIG. 6 are not shown, they are still part of the simplified computer system 300.

As described above, the secure browser service 340 coordinates the secure browser session between the client device 310 and the virtual server 350. The secure browser service 340 isolates web browsing to protect an enterprise network from browser-based attacks. The secure browser service 340 operates a secure remote browser 358 which appears as a tab in the local browser 320. However, this causes undesirable side-effects.

One undesirable side-effect is the address (i.e., URL) displayed on the address bar of the local browser 320 is the address for the secure browser service 340 rather than the address of the target website being launched by the secure remote browser 358. As shown in the screenshot 501 in FIG. 12, the address bar 503 displays an address for the secure browser service 340. As noted above, an example secure browser service is provided by Citrix Systems, Inc. Consequently, the Citrix icon 505 is also displayed representing Citrix cloud services. The displayed address in the address bar 503 is also short-lived and is specific to this particular session. Thus, if this secure browser link is copied into a Word document, a Slack conversation or an email, for example, the address is useless to the other party because the link is specific to that client device and its session with the browser service. Also the URL in some implementations may contain a ticket as part of the URL query parameters and this ticket is for one time use only.

Furthermore, the displayed address does not hint at or otherwise identify the target website, so a user could interact with a malicious website without knowing it. This includes the user inadvertently entering their user credentials 314 into the malicious site. The user has no way to perform their normal checks of the displayed address, as described further below.

One of these checks involves the presence of the lock icon 507 or padlock icon displayed with the address bar 503. The lock icon 507 indicates a secure mode where communications between a browser and a web server are encrypted. This type of connection is designed to prevent anyone from reading or modifying the data exchanged with the website. However, the lock icon 507 does not indicate if the target website being accessed is encrypted. Instead, the lock icon 507 indicates that communications with the secure browser service 340 is encrypted. So, the user may think their communications are fully protected when in fact they are not. A malicious actor could be along the path of such an insecure communications channel. Thus, present technologies are deficient in that they cannot provide users with means to know when an address is safe to use or not. In short, the lock icon can give users a false sense of security in such instances, and may lead to losses in sensitive or private data.

Other checks include examining the domain name of the target website in the address bar 503. However, in this case, the domain name of the target website is unavailable to the user since the address of the secure browser service 340 is displayed. So, the user assumes the risk that the address is not a malicious one in order the secure browser service. This is an uncomfortable experience for many security savvy users and goes against many of the current industry best practices for information security regarding phishing schemes. More significantly, the use of unknown domains may lead to a loss of personal data, as explained above. Further, a user might check the certificate only to see the certificate does not belong to the target website, but belongs to the secure browser service 340.

As will be discussed in detail below, the local browser 320 in the client device 310 further includes a navigation request handler monitor 323 and a refresh request handler monitor 325. The function of the navigation request handler monitor 323 is to display the remote target URL, rather than displaying the address of the secure remote browser 358. When the URL changes, the secure remote browser 358 fires an event. Using JavaScript, browser extension, or native code the secure remote browser 358 sends the changed URL to the local browser over a separate channel (such as ICA). The function of the refresh request handler monitor 325 is to propagate user-initiated browser refresh events (e.g., CTRL-R) on the local browser 320 to the secure remote browser 358. When the user refreshes the local browser 320, the local browser 320 fires an event. Using JavaScript, browser extension, or native code the local browser 320 sends that event to the secure remote browser 358 over a separate channel (such as ICA).

The local browser 320 may be an unmanaged browser 320(1) or a managed browser 320(2) as discussed above. For the unmanaged browser 320(1), a browser plug-in 324 can be used to provide these functions since the source code of the browser cannot be modified. For the managed browser 320(2), the source code of the browser is modified to provide these functions.

In the virtual server 350, the secure remote browser 358 further includes a navigation request handler change monitor 327. The function of the navigation request handler change monitor 327 is to monitor for navigation changes in the secure browser session 358. Navigation changes, for example, are changes to the displayed URL which can occur by timeouts (after an advertisement has been viewed or a logged-in session has timed out), and by user interaction (clicking a link). The navigation request handler change monitor 327 may be provided via a browser extension or by modifying the source code for the secure remote browser 358. The secure remote browser 358 may be either an unmanaged browser or a managed browser.

Figure 13:
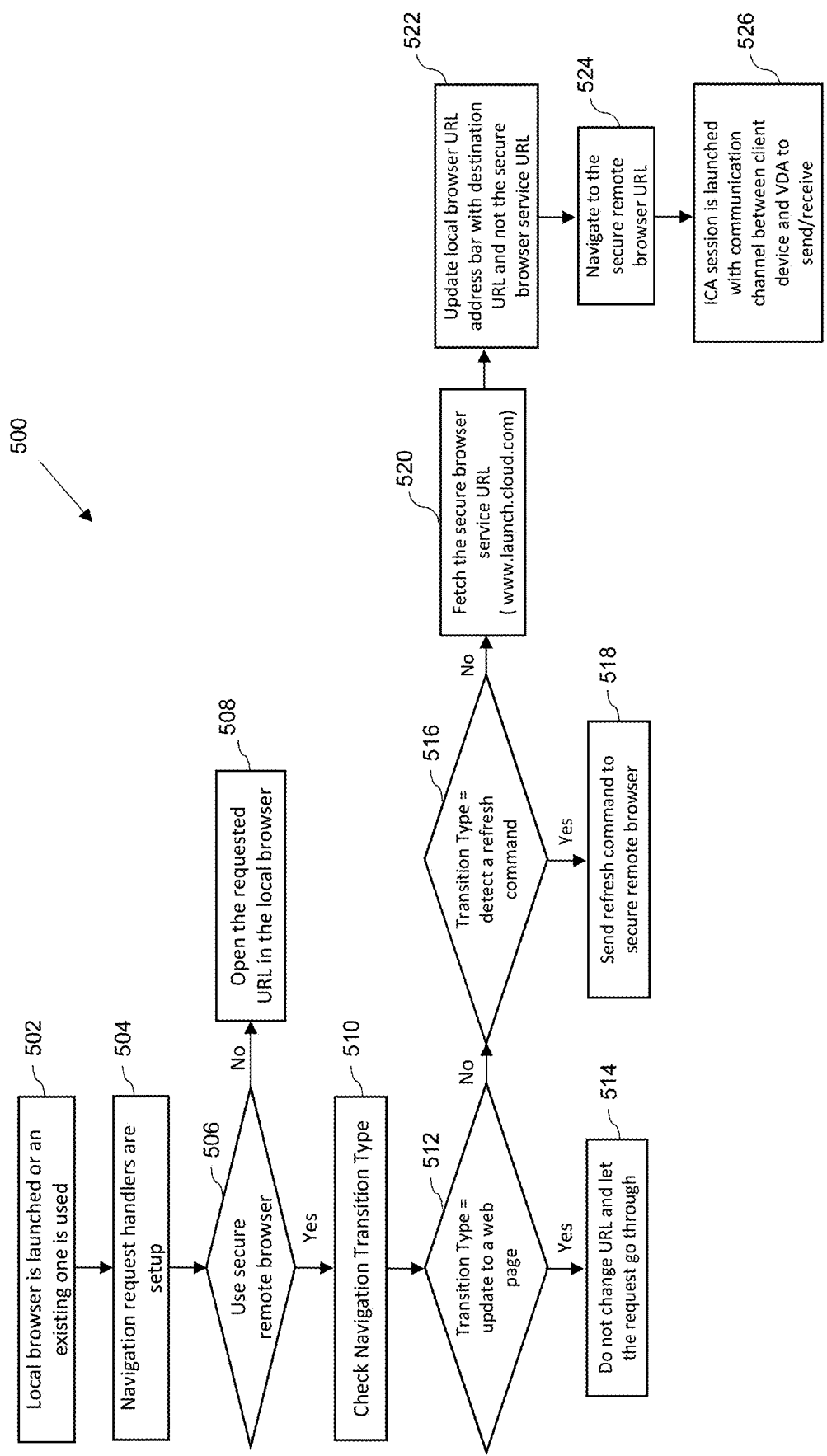
FIG. 13 is a flow diagram for providing the bi-directional browser synchronization from the perspective of the client device illustrated in FIG. 11.

Referring now to FIG. 13, a flow diagram 500 illustrating bi-directional local browser/secure remote browser synchronization from the perspective of the client device 310 will be discussed.

From the start, the local browser 320 is launched or if one already exists it is used at Block 502. The local browser 320 may be an unmanaged browser 320(1) or a managed browser 320(2). For example, a user initiates a web request, such as gmail.com for a target URL. The user may click a link within a published app, such as a web/SaaS app, or types in the URL in the address bar of the local browser 320.

Navigation request handlers are setup at Block 504, and are used to determine if the secure remote browser 358 is to be used.

Setup of the navigation request handlers is typically performed by an IT administrator. The local browser 320 handles the navigation requests.

A navigation occurs, for example, in response to the user clicking the link within a published resource or typing in the browser address bar of the local browser 320. Based on how the navigation request handlers are setup, a determination is made at Block 506 on whether the navigation request handler should use the secure remote browser.

If the decision is to not use the secure remote browser 358, then gmail.com is launched using the local browser 320 at Block 508. If the decision is to use the secure remote browser 358, then a secure browser service session 340 is established and the process continues to Block 510.

At Block 510, webNavigation.TransitionType is checked. Navigation transition types include updates to an established link or a refresh command, for example. The 'transition type' is an implementation detail, and specifies how the new URL was obtained. For example, the new URL may be obtained by the user typing it in, clicking on a link, or clicking on a bookmark.

At Block 512, a determination is made on whether the navigation transition type is an update to an established link by examining webNavigation.TransitionType. Example updates include the user updating a page by typing in their name, composing an email, or submitting an updated form within the page.

Updates to an established link do not include a change in the current address (i.e., URL) of the website. In this case, the process continues to Block 514 so that the update request goes through.

Figure 12:
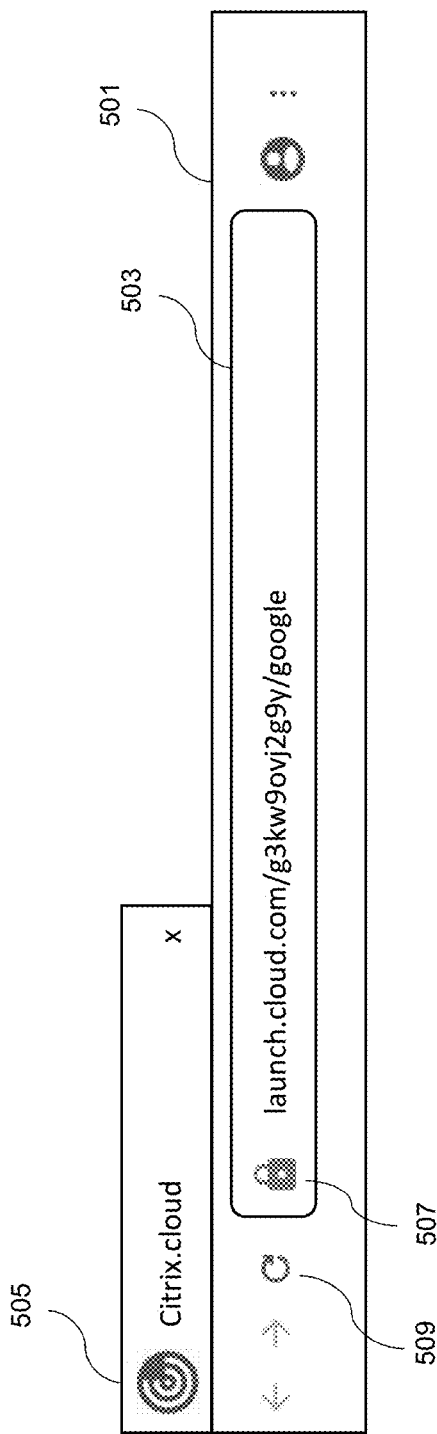
FIG. 12 is a screenshot of a local browser tab in the client device illustrated in FIG. 11 with an address of the secure browser service being displayed.

If the navigation transition type is not an update, then the process continues to Block 516. In this block, a determination is made on if the navigation transition type is a refresh command. A refresh command can be initiated by the user clicking the refresh symbol 590 as illustrated in FIG. 12. The refresh command allows the displayed web page to be reloaded.

If the navigation transition type is a refresh command, then the process continues to Block 518. In this case, the refresh command is sent to the secure remote browser 358 to perform the refresh. If the navigation transition type is not refresh command, then the process continues to Block 520.

As part of this process flow, a determination is made on if the user typed the URL (e.g., transition_type=PAGE_TRANSITION_TYPED) or clicked a link (e.g., transition_type=PAGE_TRANSITION_LINK). In such cases, the web request URL (e.g., gmail.com) can be shown on the address bar of the local browser 320. A command (e.g., a virtual channel command) is then sent to the remote secure browser 358 to retrieve security information for that target website. This allows the user to see the target website's certificate by, for example, clicking on the lock icon 507.

Figure 14:
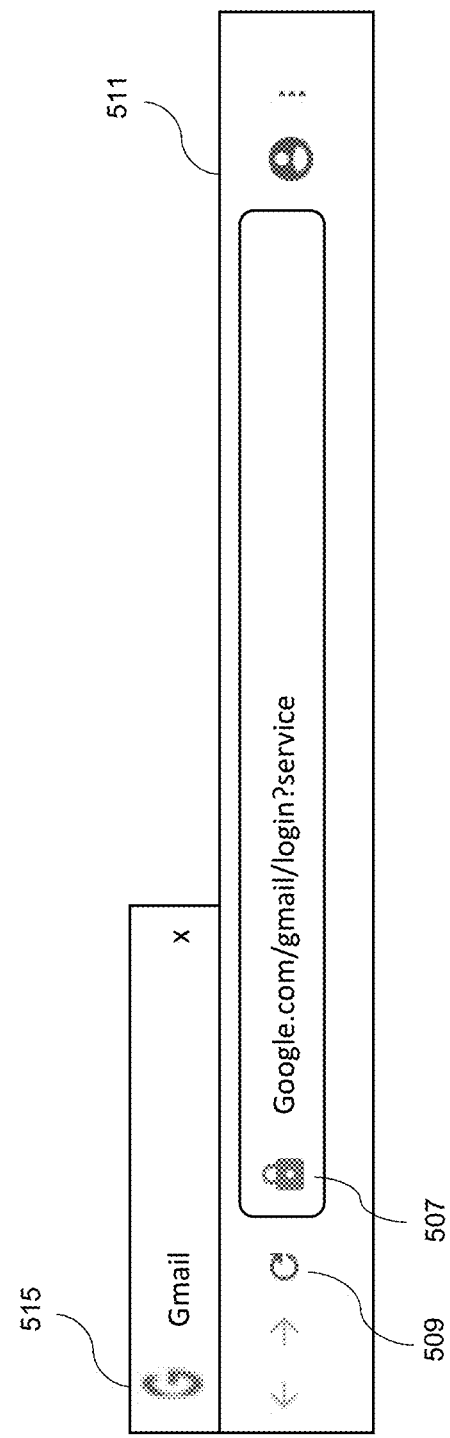
FIG. 14 is a screenshot of a local browser tab in the client device illustrated in FIG. 11 where the address of the secure browser service has been replaced with an address of the target website.

At Block 520, the already received secure browser service URL (e.g., launch.cloud.com) is fetched. At Block 522, the address bar of the local browser 320 is updated with the destination URL and not the secure browser service URL. This update is performed by sending the new URL from the remote secure browser 358 to the local browser 320, over a separate channel (such as ICA), so the local browser 320 can display that URL on its address bar. As shown in the screenshot 511 in FIG. 14, the address bar 503 now displays the address for the target website which is Gmail. In addition, the Citrix Cloud icon 505 is replaced with the Gmail icon 515.

Navigation is made to the address of the secure remote browser 358 at Block 524. The secure browser process 354 on the VDA 352 receives a connection request from the client device 310. As part of the connection request, the secure browser process 354 receives an ICA file with a ticket. To validate the connection request, the secure browser process communicates with the secure browser service 340 to validate the ticket. If the ticket is validated, then an ICA session is connected at Block 526 between the client device 310 and the VDA 352. The secure remote browser 358 is then launched to open gmail.com.

Navigation request handlers are also setup for the secure remote browser 358. On WebNavigation.onCompleted/onDOMLoadCompleted events, URL (document/URL) and the title (document/title) of the page may be obtained. Secure remote browser state/information is sent to the local browser 320 via a virtual channel. The local browser 320 receives and updates the information received from the secure remote browser 358. Examples include changing the title of the local browser and updating the URL of the local browser. When implemented as changes to the browser source code (but not as a browser plugin), the lock icon 507 (site information) is updated with the target site's certificate information.

Figure 15:
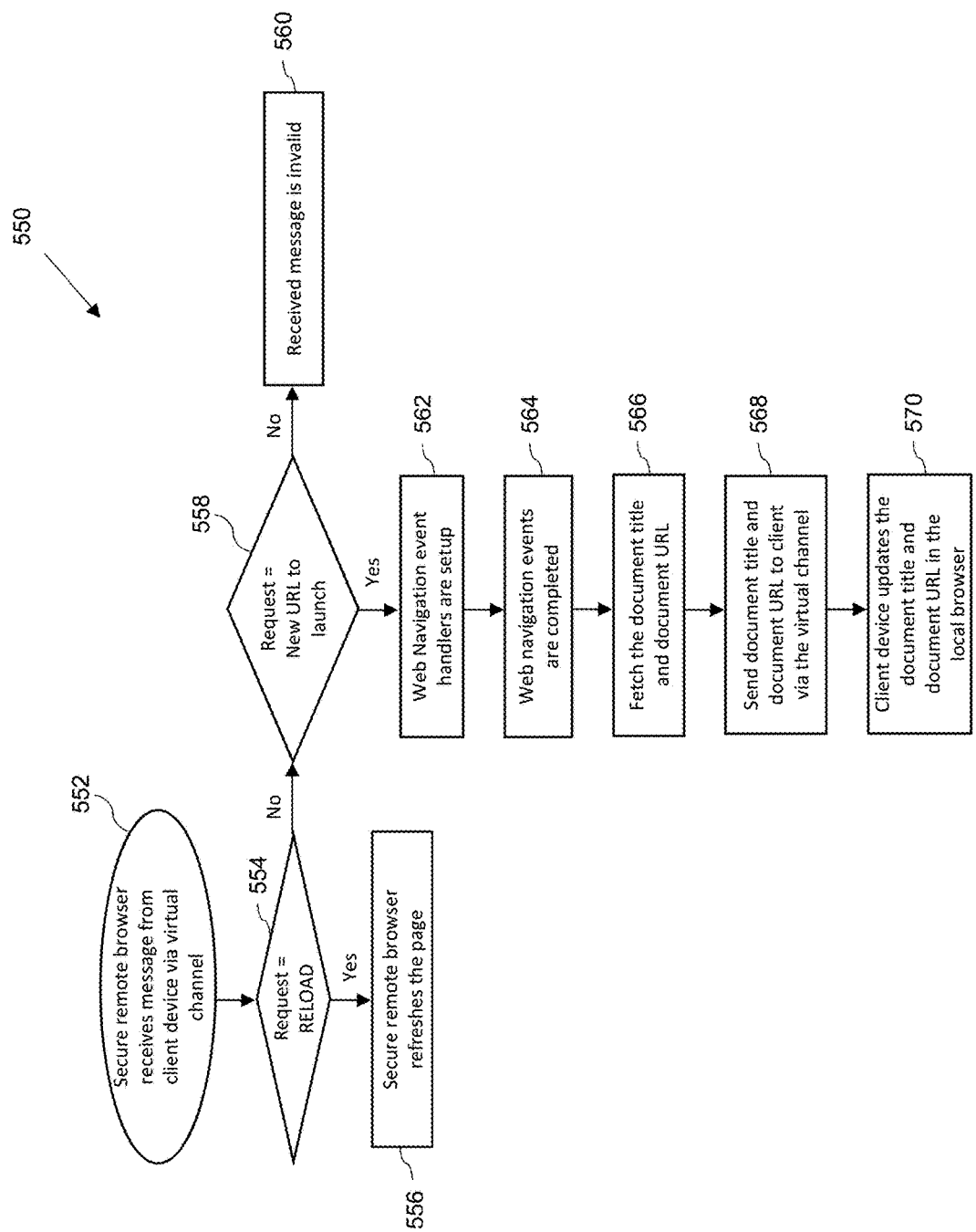
FIG. 15 is a flow diagram for providing the bi-directional browser synchronization from the perspective of the secure remote browser illustrated in FIG. 11.

Referring now to FIG. 15, a flow diagram 550 illustrating bi-directional local browser/secure remote browser synchronization from the perspective of the secure remote browser 358 will be discussed. From the start, the secure remote browser 358 receives a message at Block 552 from the client device 310 via a virtual channel.

A determination is made at Block 554 if the received request is a refresh command. A refresh is determined by monitoring the onbeforeunload event and navigation.type value. If the received message is a refresh command, then the process continues to Block 556 where the secure remote browser 358 refreshes the page. If the received message is not a refresh command (that is, is not navigation.type==1), then a determination is made at Block 558 if the received message is a new URL to launch.

If the received message is not a new URL to launch, then the process continues to Block 560 wherein the received message is considered invalid. In this case, nothing is done. If the received message is a new URL to launch, then the process continues to Block 562. At this block, the navigation event handlers are setup as discussed above.

At Block 564, the web navigation events are completed. The document title and document URL, as they would be displayed by the secure remote browser 358, are synchronized with the local browser 320 at Block 566. This information may be obtained from the secure remote browser 358 by JavaScript, a browser extension, or code changes to the remote browser. This information is sent to the client device 310 via the virtual channel at Block 568. The client device 310 receives this information and updates the URL and the title in the local browser 320 at block 570.

Figure 16:
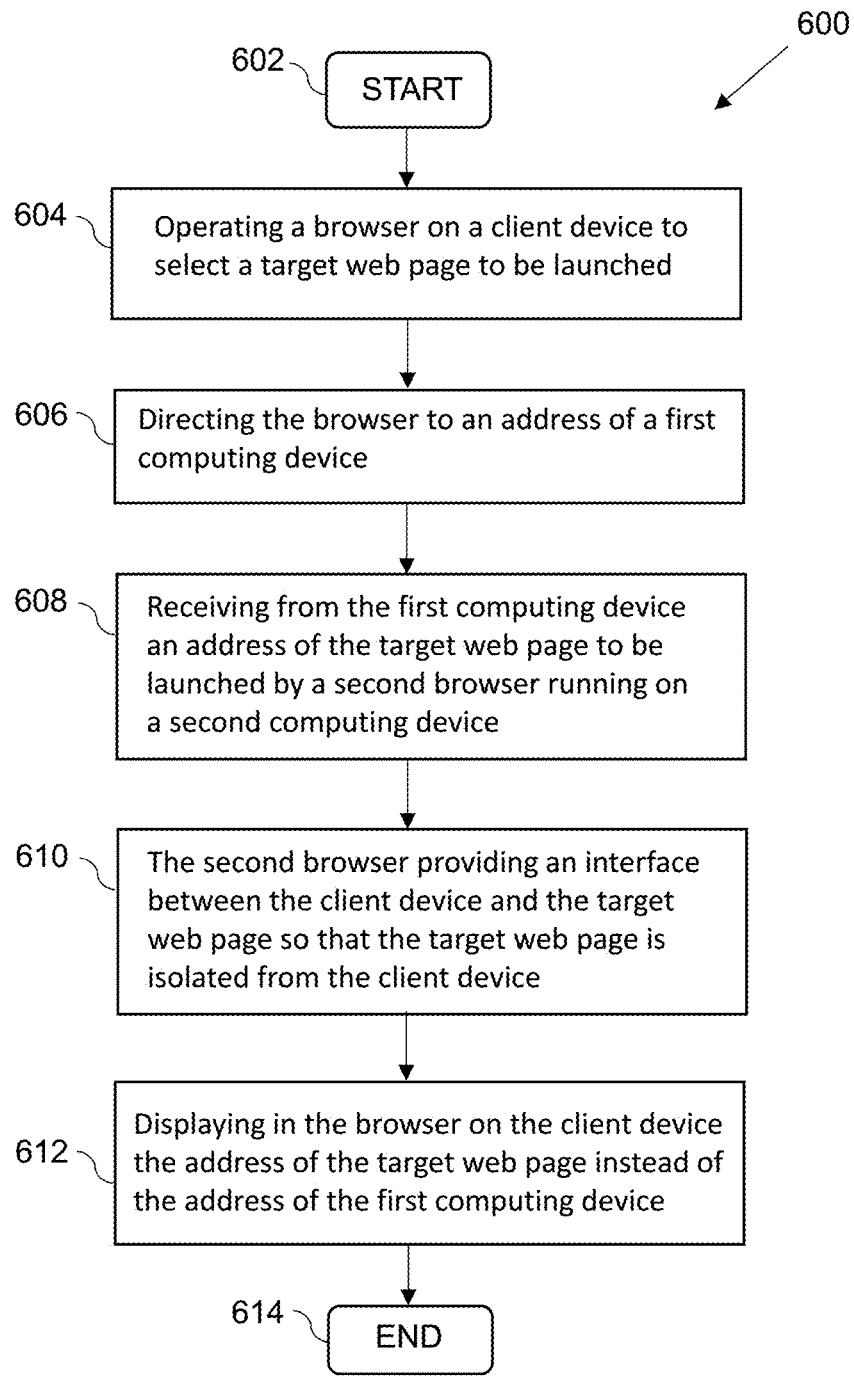
FIG. 16 is a flow diagram for operating the client device illustrated in FIG. 11.

From a perspective of the client device 310 as discussed above, the client device 310 includes the local browser 320 and a processor which runs the local browser 320. A method for operating the client device 310 will be discussed in reference to the flow diagram 600 in FIG. 16.

From the start (Block 602), the method includes operating the local browser 320 on the client device 310 to select a target web page to be launched using a secure remote browser 358 at Block 604. The local browser 320 is directed at Block 606 to a secure browser service 340 having an address associated therewith. The local browser 320 receives from the secure browser service 340 an address (e.g., a secure remote browser launch address) at Block 608. The secure remote browser 358 is to provide an interface between the client device 310 and the target web page so that the target web page is isolated from the client device 310 at Block 610. The method further includes displaying in an address bar of the local browser 320 the secure remote browser launch address instead of the address for the secure browser service at Block 612. The method ends at Block 614.

As will be appreciated by one of skill in the art upon reading the above disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed:

1. A computing device comprising:
a memory and a processor configured to perform the following:
receive credentials stored on a client device for a website having a web page, responsive to the client device initiating a launch of the website through a first browser at the client device,
with the first browser running in a first browsing session, and run a second secure remote browser in a second browsing session to launch the website for display at the client device using the received credentials, the second secure remote browser is isolated from the first browsing session to prevent the website from accessing other data of the client device session;
display the web page; generate a refresh command by the first browser to refresh the displayed web page; intercepting by the client device the generated refresh command;
and redirecting the intercepted refresh command to the second secure remote browser, with the second secure remote browser refreshing the web page being displayed by the client device.

2. The computing device according to claim 1 wherein the isolation prevents the website from directly transferring any browsing data to or from the client device.

3. The computing device according to claim 1 wherein said processor runs the second secure remote browser in a computing session, and is further configured to discard the received credentials after the computing session has ended.

4. The computing device according to claim 1 wherein the received credentials are only for the website to be launched.

5. The computing device according to claim 1 wherein the credentials are received from the client device.

6. The computing device according to claim 1 wherein said processor is further configured to perform the following:
store the credentials during a computing session;
monitor for changes in the stored credentials made by a user of the client device during the computing session; and
provide the changes in the credentials to the client device for the client device to update the credentials stored on the client device.

7. The computing device according to claim 1 wherein said processor is assigned to the client device by a second computing device after the second computing device receives a request from the client device for the website to be launched.

8. The computing device according to claim 7 wherein said processor receives a launch address for the website from the second computing device.

9. The computing device according to claim 7 wherein the request from the client device for the website to be launched includes the credentials, and wherein said processor receives the credentials from the second computing device.

10. The computing device according to claim 7 wherein said processor is further configured to validate the client device via the second computing device prior to running the second secure remote browser.

11. The computing device according to claim 1 wherein said processor is further configured to autofill the received credentials in order to launch the website.

12. A method comprising:
receiving credentials stored on a client device for a website responsive to the client device initiating a launch of the website through a first browser at the client device, with the first browser running in a first browsing session, and running a second secure remote browser in a second browsing session to launch the website for display at the client device using the received credentials, the second secure remote browser is isolated from the first browsing session to prevent the website from accessing other data of the client device via the first browsing session;
displaying by the client device the website;
generating a refresh command by the first browser in the client device to refresh the displayed website;
intercepting by the client device the generated refresh command;
and redirecting the intercepted refresh command to the second secure remote browser, with the second secure remote browser refreshing the website being displayed by the client device.

13. The method according to claim 12 wherein the second secure remote browser is running in a computing session, and further comprising discarding the received credentials after the computing session has ended.

14. The method according to claim 12 wherein the received credentials are only for the website to be launched.

15. The method according to claim 12 wherein the credentials are received from the client device .

16. The method according to claim 12 further comprising:
storing the credentials during a computing session;

monitoring for changes in the stored credentials made by a user of the client device during the computing session; and providing the changes in the credentials to the client device for the client device to update the credentials stored on the client device.

17. The method according to claim 12 wherein receiving the credentials and running the second secure remote browser are performed by a first computing device, with the first computing device being assigned to the client device by a second computing device after the second computing device receives a request from the client device for the website to be launched.

18. The method according to claim 17 wherein the request from the client device for the website to be launched includes the credentials, and wherein the first computing device receives the credentials from the second computing device.

19. The method according to claim 12 further comprising autofilling the received credentials in order to launch the website.

20. A method comprising:

operating a first browser in a first browsing session on a client device to select a web page to be launched;

directing the first browser to an address of a first computing device in response to selection of the web page, the first computing device to provide access to a second secure remote browser, with the second browsing session being isolated from the first browsing session to prevent the web page from accessing data of the client device via the first browsing session;

opening the web page with use of the address of the first computing device and the second secure remote browser;

modifying the display of the web page opened in the second secure remote browser provided by the first browser on the client device to include the address of the web page instead of the address of the first computing device;

displaying by the client device the web page;

generating a refresh command by the first browser in the client device to refresh the displayed web page;

intercepting by the client device the generated refresh command; and redirecting the intercepted refresh command to the second secure remote browser, with the second secure remote browser refreshing the web page being displayed by the client device.

21. The method according to claim 20 wherein the displayed address of the web page provides an identity of the web page so a user of the client device avoids interacting with a malicious site.

22. The method according to claim 20 wherein the second secure remote browser is to run in a computing session, and further comprising copying the displayed address of the web page to be used to launch the web page in a different computing session.

23. The method according to claim 20 further comprising updating the first browser in the client device in response to an address change in the second secure remote browser.

24. The method according to claim 20 further comprising providing an update to the first browser in the client device in response to a title change in the web page.

25. The method according to claim 20 further comprising updating certificate information for the launched web page that can be displayed by the client device.

* * * * *